United States Patent [19]

Bhagavatula

[11] Patent Number: 4,494,969
[45] Date of Patent: Jan. 22, 1985

[54] METHOD OF FORMING LAMINATED SINGLE POLARIZATION FIBER

[75] Inventor: Venkata A. Bhagavatula, Corning, N.Y.

[73] Assignee: Corning Glass Works, Corning, N.Y.

[21] Appl. No.: 538,326

[22] Filed: Oct. 3, 1983

[51] Int. Cl.³ ............... C03B 37/075; G02B 5/172
[52] U.S. Cl. .................... 65/3.12; 65/3.11; 350/96.33
[58] Field of Search .............. 65/3.11, 3.12; 350/96.29, 96.30, 96.33

[56] References Cited

U.S. PATENT DOCUMENTS

| | | | |
|---|---|---|---|
| 4,179,189 | 12/1979 | Kaminow et al. | 350/96.3 X |
| 4,360,371 | 11/1982 | Blankenship et al. | 65/3.12 |
| 4,415,230 | 11/1983 | Keck | 350/96.33 |

Primary Examiner—Kenneth M. Schor
Attorney, Agent, or Firm—W. J. Simmons, Jr.

[57] ABSTRACT

A process for manufacturing a preform from which is drawn an optical fiber, the core of which comprises layers of different glass composition. Layers of glass soot are deposited on the flat, longitudinally extending sides of a thin, elongated mandrel. Adjacent soot coatings have different refractive indices. A preliminary coating of cladding glass soot is deposited on the laminated soot structure. The resultant composite body is consolidated and stretched to form a rod or core structure upon which the final coating of cladding soot is deposited. The resultant composite body is consolidated and drawn into an optical fiber. In a modification of the this method, the mandrel is removed after the planar soot coatings and preliminary coating of cladding soot are deposited thereon. The resultant soot body is consolidated and processed as described previously.

6 Claims, 6 Drawing Figures

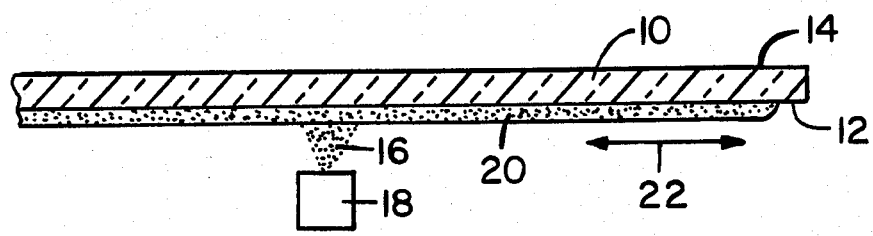
Fig. 1
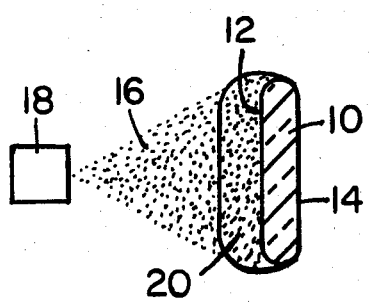
Fig. 2
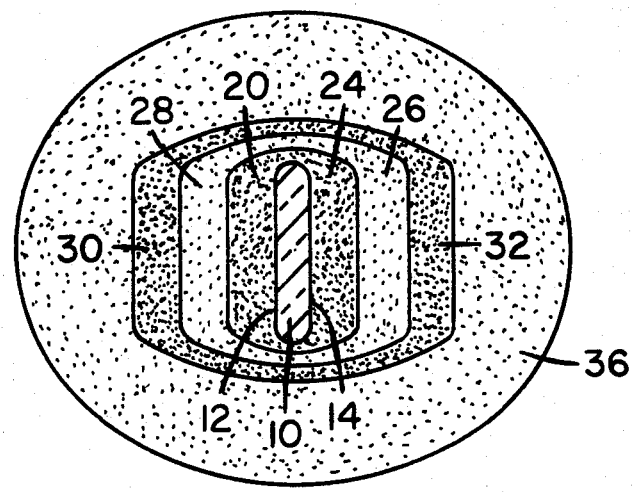
Fig. 3
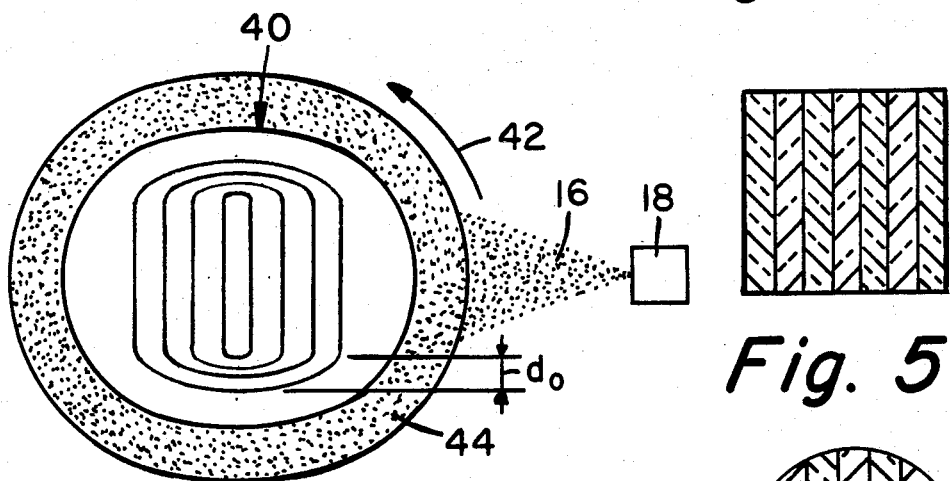
Fig. 4
Fig. 5
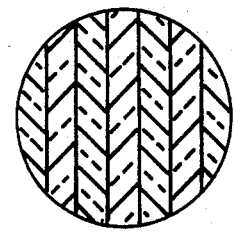
Fig. 6

METHOD OF FORMING LAMINATED SINGLE POLARIZATION FIBER

BACKGROUND OF THE INVENTION

The present invention relates to optical fibers. More particularly, it relates to a method for manufacturing a single-mode optical fiber in which the core is formed of laminae, adjacent ones of which have different refractive indices.

In certain applications of single-mode optical waveguide fibers, e.g. gyroscopes, sensors and the like, it is important that the propagating optical signal retain the polarization characteristics of the input light in the presence of external depolarizing perturbations. This requires the fiber to have an azimuthal asymmetry of the refractive index profile. Copending Application Ser. No. 499,898 entitled "Polarization Retaining Single-Mode Optical Waveguide" filed in the name of V. A. Bhagavatula et al. on June 1, 1983 describes a fiber, the core of which is formed of a plurality of laminae of transparent material, adjacent ones of which have different refractive indices. It would be advantageous to form the core of such a fiber by a chemical vapor deposition (CVD) technique so that the fiber is suitable for transmitting optical signals over long distances.

Methods of forming optical fibers having an azimuthal asymmetry of the refractive index profile are disclosed in U.S. Pat. Nos. 3,980,459 (Li) and 3,982,916 (Miller) and in U.S. patent application Ser. No. 500,004, "Method of Forming Optical Fiber Having Laminated Core" (A. Sarkar) filed June 1, 1983. One or more layers are formed on the inner surface of a substrate tube by flowing a reactant vapor through the tube and heating the tube and contained vapor mixture with a moving heat source, external to the substrate tube, such that a suspension of glass particles is produced within the substrate tube, the particles traveling downstream and being fused to form a continuous glassy deposit on the inner surface. An asymmetric structure is formed by inserting a rod into the substrate tube or by asymmetrically heating the substrate tube to preferentially deposit glass particles on a specific region of the tube.

SUMMARY OF THE INVENTION

It is an object of the present invention to provide a method forming an optical fiber preform having an azimuthally asymmetric core region comprising laminations of glass, adjacent ones of which have different refractive indices. Another object is to provide a method of making such fibers which is not subject to excessive loss due to breakage.

Briefly, the present invention relates to a method of forming an optical fiber. Such a method conventionally comprises the steps of providing an elongated core structure and applying a layer of cladding glass to the core structure. The resultant structure is drawn into an optical fiber. In accordance with the present invention the step of providing a core structure is characterized in that it comprises providing an elongated mandrel having first and second opposed planar sidewalls, and depositing on the first and second sidewalls a plurality of planar layers of glass particles, adjacent onces of which have different refractive indices. The resultant porous preform is consolidated to form an elongated core structure having a plurality of parallel dense glass laminae.

BRIEF DESCRIPTION OF THE DRAWING

FIGS. 1 and 2 illustrate the application of successive coatings of glass soot to a mandrel.

FIG. 3 is a cross-sectional view of a porous core structure.

FIG. 4 illustrates the application of cladding soot to a consolidated core structure.

FIGS. 5 and 6 are cross-sectional views of modified core structures.

DETAILED DESCRIPTION OF THE INVENTION

It is to be noted that the drawings are illustrative and symbolic of the present invention and there is no intention to indicate the scale or relative proportions of the elements shown therein.

It is well known that single-mode optical fibers can be fabricated by first forming the core portion thereof as a separate structure and thereafter applying to the core structure a layer of cladding glass and drawing the composite body to form an optical fiber. U.S. Pat. No. 4,360,371, for example, teaches that an initially fabricated core structure can be rotated about its longitudinal axis while a layer of cladding glass particles is deposited thereon by a flame hydrolysis burner which is longitudinally translated with respect to the rotating core structure. The resultant structure can be drawn into an optical fiber, or it can be heated to a temperature sufficient to consolidate the porous portion thereof and thereafter drawn into an optical fiber. A core structure can also be inserted into a hollow glass cylinder and the resultant composite structure heated and drawn into an optical fiber as taught in U.S. Pat. No. 3,932,162.

In accordance with the present invention a core structure comprising a laminated core is formed in accordance with the method illustrated in FIGS. 1, 2, and 3. Elongated mandrel 10 of flattened cross-sectional configuration has first and second opposed planar surfaces 12 and 14. In a first embodiment hereof wherein mandrel 10 forms a part of the resultant optical fiber, the mandrel must be formed of extremely pure glass and is therefore preferably formed by a CVD process. For example, glass particles formed by the flame hydrolysis process can be collected and cast into the desired shape in accordance with the process disclosed in European Published Application No. 0084438 published July 27, 1983. Mandrel 10 could also be made by directing soot from a flame hydrolysis burner onto a substrate to build up a coating of sufficient thickness, consolidating the soot to a dense glass and severing suitably shaped strips from the dense glass body by sawing, grinding or the like. The resultant strips can be ground and polished to the final desired shape. After such mechanical operations as sawing and grinding, the surface of the resultant mandrel should be cleaned by subjecting it to an etchant such as HF, rinsing and drying.

A stream 16 of glass soot is directed toward surface 12 of mandrel 10 from soot deposition means 18 which can comprise any soot deposition burner or burners including flat-faced burners, ribbon burners, or the like, which provide a stream of particulate material. For an illustration of suitable burners, reference is made to U.S. Pat. Nos. 3,565,345 and 4,165,223. Means 16 may also comprise nozzles such as those disclosed in U.S. Pat. No. 3,957,474 which emit reactant vapors which are heated by means such as a laser beam to form a soot stream. Since a soot deposition burner is preferred, reference will hereinafter be made to that particular type of deposition means.

While maintaining mandrel 10 rotationally stationary, it is translated longitudinally one or more times with respect to burner 18 as indicated by arrow 22 to deposit a soot coating 20 on surface 12. Reference herein to translating mandrel 10 with respect to stream 16 includes translating the stream 16 with respect to a stationary mandrel or any combination of movement by mandrel 10 and stream 16 which results in the deposition of coating 20. Mandrel 10 is then rotated 180°, and thereafter translated with respect to burner 18 one or more time to deposit soot coating 24 on surface 14 thereof. The composition of soot coatings 20 and 24 is such that the refractive index thereof is different from that of mandrel 10 in the present embodiment wherein the mandrel remains as part of the resultant optical fiber. The composition of soot stream 16 is then changed and two additional soot coatings 26 and 28 are deposited in the manner described above upon the surfaces of coatings 24 and 20, respectively. In like manner, the composition of soot stream 16 is again changed and soot coatings 30 and 32 are deposited on the surfaces of coatings 28 and 26, respectively. In accordance with the teachings of the aforementioned Bhagavatula et al. application, it is only necessary that adjacent soot coatings have different refractive indices. In a particular embodiment, coatings 26 and 28 have the same refractive index as mandrel 10 and coatings 20, 24, 30 and 32 all have the same refractive index which is different from that of mandrel 10.

After the desired number of coatings is applied to mandrel 10, the resultant porous preform can be consolidated to form an elongated core structure. It is sometimes preferred to add a thin layer of cladding material to this core structure. FIG. 3 shows a coating 36 of cladding soot which has been deposited over the outer coatings 30 and 32 of core soot. As disclosed in U.S. Pat. No. 4,360,371, strips of cladding glass soot can be deposited over the flattened sidewalls of the laminated core soot structure prior to rotating the core soot structure and depositing coating 36 of cladding soot. This accelerates the formation of a circular outer cladding surface. However, the steps of depositing such strips of cladding glass soot may be omitted without affecting to too great of an extent the geometry of the resultant fiber. If cladding soot 36 is deposited directly upon layers 30 and 32 of core soot, the soot stream from the burner will deposit a greater amount soot when the flattened portions of the core soot structure are facing the burner than when the rounded or corner portions thereof are facing the burner since soot collection efficiency is a function of target size. This tends to decrease the noncircularity of the deposited structure as coating 36 is built up.

The soot structure shown in FIG. 3 is consolidated to form elongated core structure 40 which is shown in cross-section in FIG. 4. After the consolidation process, the dense glass core structure is heated and stretched until the average cross-sectional dimension thereof is small enough that it can function as a mandrel upon which the outer cladding glass can be deposited. It is preferred that the average cross-sectional dimension of this dense glass core structure be within the range of about 4 to 10 mm. It is then severed into a plurality of rods of suitable length for mounting in a glass lathe. Core structure 40 is then rotated as indicated by arrow 42 and is translated with respect to soot stream 16 while outer coating 44 of cladding soot is built up. Substantial circularity should be achieved when the outside diameter of coating 42 is sufficient, relative to the size of the core, to enable the resultant fiber to function as a single-mode fiber.

The resultant structure can be consolidated and thereafter drawn into an optical fiber. Consolidation is preferably carried out in the presence of a halogen such as chlorine which dries the soot as it sinters.

The resultant fiber is a single polarization single-mode optical waveguide of the type taught in the aforementioned Bhagavatula et al. application. Such a fiber functions to retain input polarization only if the core laminae have a thickness less than the wavelength $\lambda$ of the light propagating therethrough. Such a thickness can be achieved by controlling the thicknesses of the deposited soot layers and by drawing or elongating those layers a sufficient amount from the time the soot is deposited until the final fiber is formed. For example, a core preform having a diameter greater than 10 mm can be heated and stretched into a rod or intermediate fiber having a diameter of about 4 to 10 mm prior to adding the cladding soot. The cladding soot is then deposited to a sufficient thickness to ensure that the thickness of each lamina in the resultant optical fiber is less than $\lambda$. The steps of overcladding and drawing can be performed any number of times as required to obtain the desired laminae thickness.

Referring to FIG. 2, it is noted that during the application of coating 20 to surface 12, a portion of the applied soot deposits on the curved portions of mandrel 10. Thus, as shown in FIG. 3, in addition to the desired planar coatings, thin regions of glass soot are built up along both of the narrow curved regions of the mandrel. The combined thickness of these thin regions of core glass is illustrated in FIG. 4 as being $d_0$. If the distance $d_0$ is significantly smaller than the distance between the surfaces of the outer core lamina, the core structure will adequately approximate the design proposed in the aforementioned Bhagavatula et al. application and therefore result in a single polarization, single-mode optical fiber.

That portion of the core structure which would result in the edge portions of the core within the thickness $d_0$ may be removed prior to depositing cladding soot 36. After the outer soot layers 30 and 32 are deposited, the resultant structure is consolidated, and the undesired portions thereof can be removed by sawing, grinding or the like. The resultant structure, which is illustrated in FIG. 5, can then be coated with cladding soot and formed into an optical fiber as described above. Prior to the application of cladding soot, the surfaces of the structure of FIG. 5 should be etched, rinsed and dried.

An alternative treatment for the core structure results in the structure illustrated in FIG. 6. The consolidated core structure can be rotated about its longitudinal axis in an abrasive slurry to round the corners. Depending upon the length of time that this treatment is preformed, a structure having any shape between that shown in FIG. 5 and that shown in FIG. 6 can be obtained.

As an alternative to the embodiment wherein the mandrel remains as part of the resultant optical fiber, mandrel 10 of FIG. 3 could be removed from the soot preform prior to the time that consolidation occurs. In this embodiment, only one of the soot layers 20 and 24 need be deposited to form the central lamina. Alternatively, the thicknesses of layers 20 and 24 can be made to be one-half of the desired thickness of the central lamina. Upon consolidation, these two thin layers combine to form the central lamina. If the mandrel is removed from the soot preform, the resultant aperture may close during the consolidation process depending upon such conditions as the viscosity of the innermost layers during the consolidation process as compared with the viscosity of the cladding glass. Also, a low pressure applied to the aperture during the consolidation process or during the process of stretching the consolidated preform into an elongated rod suitable for deposition of cladding glass, can assist aperture closing. A discussion of conditions which enhance the closing of the mandrel aperture can be found in U.S. Pat. No. 4,251,251.

Rather than depositing layers of soot, alternate ones of which have different refractive indices, it may be possible to take advantage of the variation in composition and in refractive index which naturally occurs during the deposition of a layered soot structure. As taught in the publications N. Yoshioka et al. "Graded Index Profile Formation and Transmission Characteristics of VAD Fiber", Paper No. 2, 6th ECOC, York, United Kingdom, 1980, pp 10–13 and Okamoto et al. Applied Optics, Vol. 20, No. 13, July 1, 1981, pp 2314–2318, the concentration of a dopant oxide such as $GeO_2$ in a deposited soot layer depends, inter alia, upon the temperature of the substrate. As the soot stream from a flame hydrolysis burner advances along a substrate, the temperature of the substrate at the trailing portion of the soot stream is hotter than the temperature of the leading portion thereof. This temperature variation produces compositional variations within each layer of deposited soot. The result of such compositional variations within a single soot layer is the formation of a structure having alternate layers of high and low refractive index. Thus, a single composition soot stream may be used to deposit all of the soot coatings. The compositional variation required for the existance of laminae, adjacent ones of which have different refractive indices, is obtained by the naturally occurring compositional variation within each coating. If this effect does not result in a great enough difference in refractive index between the high index and the low index regions of a deposited layer, a core formed by this technique can be employed in a fiber having additional polarization retaining characteristics such as stress rods at diametrically opposed sides of the core, an elliptically-shaped inner cladding surrounded by an outer stress cladding, or the like.

I claim:

1. In a method of forming an optical fiber comprising the steps of
    providing an elongated core structure,
    applying a layer of cladding glass to said core structure, and
    forming an optical fiber from the resultant preform, the step of providing the core structure being such that it comprises
    providing an elongated mandrel having first and second parallel longitudinally extending planar sidewalls,
    depositing on said first and second sidewalls a plurality of planar layers of glass particles, adjacent ones of which layers have different refractive indices, and
    consolidating said glass particles to form a core structure having a plurality of parallel dense glass laminae.

2. A method in accordance with claim 1 further comprising the step of applying to said plurality of layers of glass particles a layer of preliminary cladding glass particles prior to said consolidating step.

3. A method in accordance with claim 2 further comprising the steps of removing said mandrel from the composite of said plurality of layers of glass particles and said layer of preliminary cladding particles prior to said consolidating step.

4. A method in accordance with claim 1 further comprising the step of removing the portions of the longitudinal surfaces of said core structure that are orthogonal to said planar surfaces to an extent sufficient to form an elongated structure having a rectangular cross-section.

5. A method in accordance with claim 1 further comprising the step of removing portions of the longitudinal surfaces of said core structure to an extent sufficient to form an elongated structure having a rounded cross-section.

6. A method in accordance with claim 1 wherein the step of depositing comprises maintaining said mandrel rotationally stationary, directing a stream of glass particles toward said mandrel, providing relative translational motion between said mandrel and said stream to form on said first flat surface thereof a coating of glass particles, rotating said mandrel 180°, providing relative translational motion between said mandrel and said stream to form on said second flat surface thereof a coating of glass particles, changing the composition of said stream of glass particles and applying additional coatings of glass particles to the previously applied coatings, the composition of said additional coatings being such that the refractive indices of adjacent coatings are dissimilar.

* * * * *